(12) United States Patent
Yaple et al.

(10) Patent No.: US 6,259,532 B1
(45) Date of Patent: *Jul. 10, 2001

(54) METHOD AND APPARATUS FOR COMMUNICATING WITH A PLURALITY OF PERIPHERAL DEVICES THROUGH A SINGLE PARALLEL PORT

(75) Inventors: Nelson Lee Yaple, Portland; Philip W. Martin, Banks; Gregory Allen Peek, Hillsboro, all of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,669

(22) Filed: Apr. 8, 1998

(51) Int. Cl.[7] ............................................ G06F 15/00
(52) U.S. Cl. ..................................... 358/1.15; 358/1.13
(58) Field of Search ...................................... 395/114, 112, 395/113, 115; 358/1.15, 1.12, 1.13, 1.14

(56) References Cited

U.S. PATENT DOCUMENTS

| | | | | |
|---|---|---|---|---|
| 5,640,495 | * | 6/1997 | Colbert et al. | 395/112 |
| 5,727,135 | * | 3/1998 | Webb et al. | 395/113 |
| 5,819,112 | * | 10/1998 | Kusters | 395/856 |
| 5,828,855 | * | 10/1998 | Walker | 395/309 |
| 5,970,220 | * | 10/1999 | Bolash et al. | 395/114 |
| 6,073,201 | * | 6/2000 | Jolley et al. | 710/129 |

* cited by examiner

Primary Examiner—Joseph Mancuso
Assistant Examiner—Douglas Tran
(74) Attorney, Agent, or Firm—Kenyon & Kenyon (57) ABSTRACT

A method for managing shared use of a parallel port installed in a host device is provided. The method includes receiving a first type of traffic directed to the parallel port, and also receiving a second type of traffic directed to the parallel port. The first and second types of traffic are then communicated to the parallel port in a controlled manner.

23 Claims, 6 Drawing Sheets

METHOD AND APPARATUS FOR COMMUNICATING WITH A PLURALITY OF PERIPHERAL DEVICES THROUGH A SINGLE PARALLEL PORT

FIELD OF THE INVENTION

The present invention relates generally to the field of computer networking, and in particular to a method enabling the shared use of a device's parallel port for different types of traffic, such as network traffic and printer traffic.

BACKGROUND OF THE INVENTION

A personal computer (PC) is generally fitted with a parallel port, usually designated LPT1, which enables the PC to communicate with a peripheral device. The most common use for the parallel port is for transferring data from the PC to an attached printer. In a typical configuration, such as what one would expect to find in a standard shipping Windows®95 system, an application would transfer data to a printer by interfacing with a print driver (LPT.VXD) that in turn communicates with the parallel port. This print driver effectively "owns" the parallel port. In other words, the parallel port is dedicated to printer traffic, and cannot be used for any other purpose absent a system reconfiguration.

In some circumstances, it is desirable to be able to use the parallel port for more than one type of traffic. An example of such a circumstance is where a user wishes to attach an auxiliary external disk drive to his or her PC. Such external disk drives, like the omega Zip® drive, are designed to be connected to the parallel port of a PC. If, as is usually the case, the user also wishes to have a printer connected to the PC, the printer may be connected to a separate parallel port on the Zip® drive itself. In such a configuration, the parallel port on the PC must therefore be capable of use for two different purposes: passing data between the PC and the Zip® drive (for example, saving and retrieving files), and passing data between the PC and the printer.

In order to achieve this shared use of the parallel port, omega adapted an existing Windows®95 facility for supporting a facility called Port Contention Handling. See Microsoft Windows®95 Device Developer Kit Design Guide, "Virtual Communication Driver" (January 1988). The Port Contention Handling scheme involves a sharing mechanism in which a port arbitration driver, designated VCOMM.VXD, controls access to the parallel port. When data is to be transferred to either the printer or the Zip® drive through the parallel port, an associated driver on the host (LPT.VXD or IOMEGA.VXD, respectively) queries VCOMM.VXD for the capabilities of the parallel port. If the parallel port is sharable, the respective associated driver will issue a request to the port arbitration driver for permission to send data to the parallel port (typically referred to as "Acquiring" or "Stealing" the port). Once the port has been Acquired or Stolen, the particular peripheral device can directly interface with the I/O (input/output) registers associated with the parallel port, thereby enabling data to be passed between the host and that particular peripheral device (assuming the particular peripheral device supports a "pass-thru" connection architecture).

There are at least two major problems with the foregoing approach to parallel port sharing. First, the duration of the Acquire/Steal is unpredictable, resulting in a potential for data loss by one process if the other process takes too long to release the parallel port, leading to a potential depletion of buffer space. More significantly, since the port arbitration driver interface is relatively new, some major printer manufacturers, such as Hewlett-Packard and Canon, do not yet configure their print drivers to interface with VCOMM.VXD. For example, both Hewlett-Packard and Canon provide print drivers for Windows® environments that are configured as DLLs (Dynamic Link Libraries) that interface directly with the I/O registers of the parallel port, without regard to the existence of a port arbitration driver. Thus, where VCOMM.VXD is used in a Port Contention Handling arrangement for parallel port sharing, the parallel port may be Acquired/Stolen away from the printer at the VCOMM.VXD level, but the print driver DLL may nevertheless "wake-up" and interface directly to the parallel port in an effort to communicate with the printer. The result is an I/O port sharing conflict, since the Port Contention Handling driver (for example, IOMEGA.VXD) will still have control of the parallel port. This problem can be readily demonstrated by installing a Zip® drive and connecting a Hewlett-Packard DeskJet printer to the Zip® drive. A conflict will typically arise when an attempt is made to print a file that resides on the Zip® drive to the attached printer.

In view of the foregoing problems, known approaches do not provide a satisfactory solution to the problem of parallel port sharing. Accordingly, there is a need for a method and apparatus enabling the shared use of a parallel port of a device such as a PC. More specifically, such a method and apparatus should enable the parallel port to be used for at least two different types of traffic, such as network traffic and printer traffic, without creating a conflict for control of the parallel port.

SUMMARY OF THE INVENTION

An embodiment of the present invention provides a method for managing shared use of a parallel port installed in a host device. In accordance with this embodiment, first and second types of traffic directed to the parallel port are received by, for example, a parallel port access manager. The first and second types of traffic are then communicated to the parallel port in a controlled manner.

DETAILED DESCRIPTION

Embodiments of the present invention are directed to facilitating the shared use of a parallel port installed in, for example, a personal computer. Such embodiments may be advantageously applied in a system where the parallel port is to be used for at least two different types of traffic, such as network traffic and printer traffic.

Figure 1:
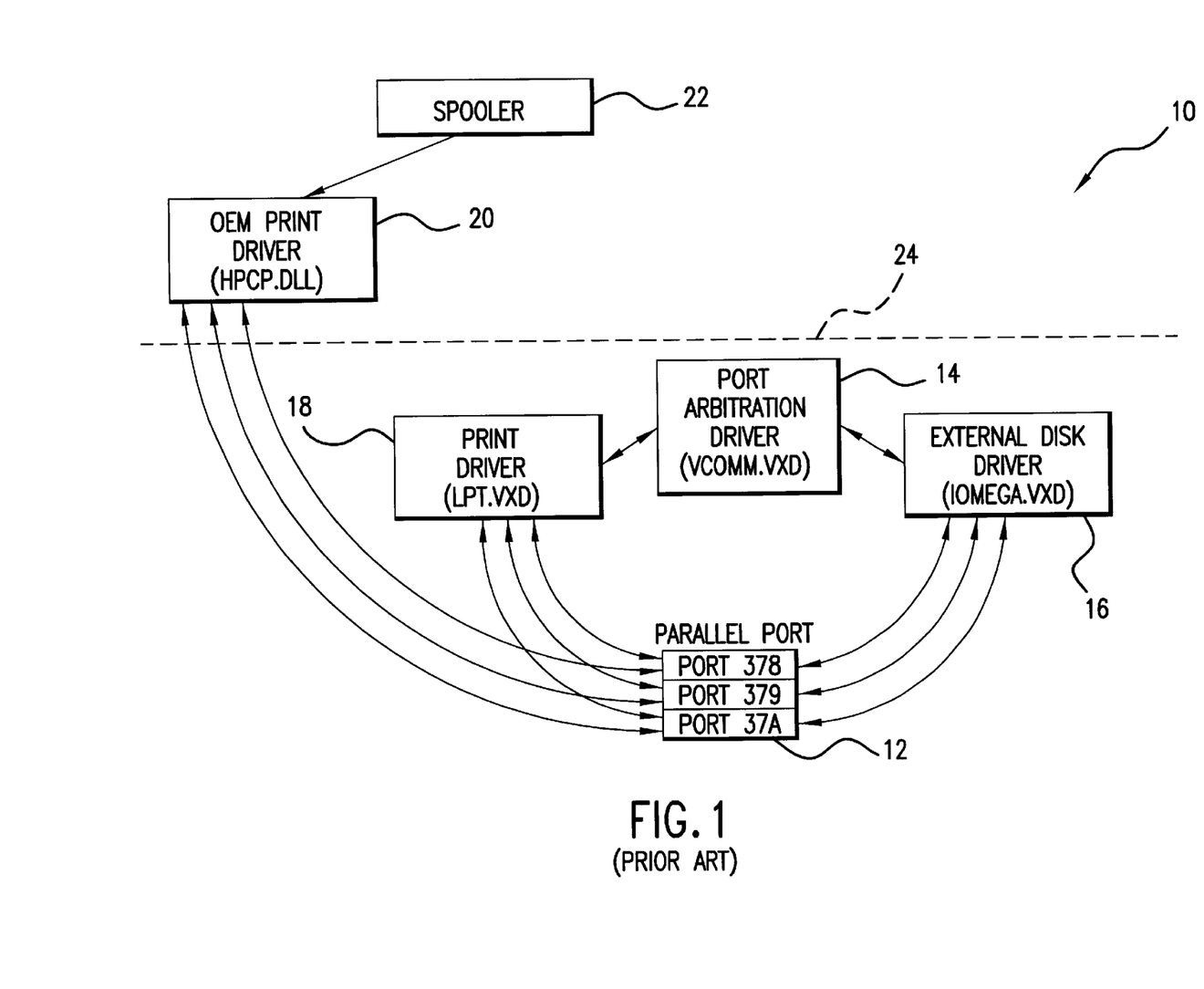
FIG. 1 is a block diagram illustrating a prior art approach to parallel port sharing.

Referring now to FIG. 1, it is known to configure a host device 10 such that a parallel port 12 may be shared for the purpose of providing access to at least two different peripheral devices (not shown). FIG. 1 illustrates an arrangement for parallel port sharing that applies a facility provided by Windows® for implementing Port Contention Handling, as discussed in the Background section above, to enable parallel port 12 to be shared by a printer (not shown) and an external Zip® drive (not shown). In this arrangement, access to parallel port 12 is governed by a port arbitration driver 14, designated VCOMM.VXD. Port arbitration driver 14 may be implemented as a virtual device driver, or VxD. A VxD is a 32-bit Ring 0 device driver that is typically used to manage a system resource, such as a hardware device or installed software, so that more than one application can use the resource at the same time. As shown, VxD's operate below the boundary 24 between Ring 3 (where applications run) and Ring 0 (where device drivers run). A purpose of boundary 24 is to isolate applications from system resources, since Ring 0 is effectively an open access environment.

Each of the peripheral devices accessible through parallel port 12 has associated with it a respective virtual device driver that is responsible for securing control of parallel port 12. A printer driver 18, designated LPT.VXD, is associated with the printer; and an external disk driver 16, designated IOMEGA.VXD, is associated with the Zip® drive. Thus, in accordance with the illustrated arrangement, if an application running on host device 10 has data to send to the printer, it calls print driver 18 with a request to print. Print driver 18 then calls port arbitration driver 14 with a request for control of parallel port 12. Once port arbitration driver grants that request, print driver 18 is able to communicate with the printer through parallel port 12. As shown, parallel port 12 comprises three parallel port I/O registers, designated Port 378, Port 379, and Port 37A, through which print driver 18 exchanges data with the printer. Print driver will retain control over parallel port 12 either until the print transaction is completed, or port arbitration driver 14 grants a request for control of parallel port 12 received from external disk driver 16.

As is also shown in FIG. 1, host device 10 may be running a OEM (original equipment manufacturer) print driver 20, designated HPCP.DLL, that is not configured to route print requests to port arbitration driver 14. When an application has data to print, that data may be buffered in spooler 22 for subsequent transfer by OEM print driver 20. When OEM print driver 20 has data to print, it attempts to access parallel port 12 directly (rather than through port arbitration driver 14). However, if another driver, such as external disk driver 16, has already been granted control over parallel port 12 by port arbitration driver 14, then OEM print driver 20 will be unable to complete its print request. This conflict for control of parallel port 12 can cause a loss or corruption of data, or can cause host device 10 to become inoperable. Embodiments of the present invention are directed to avoiding conflicts of this type when parallel port 12 is to be shared.

Figure 2:
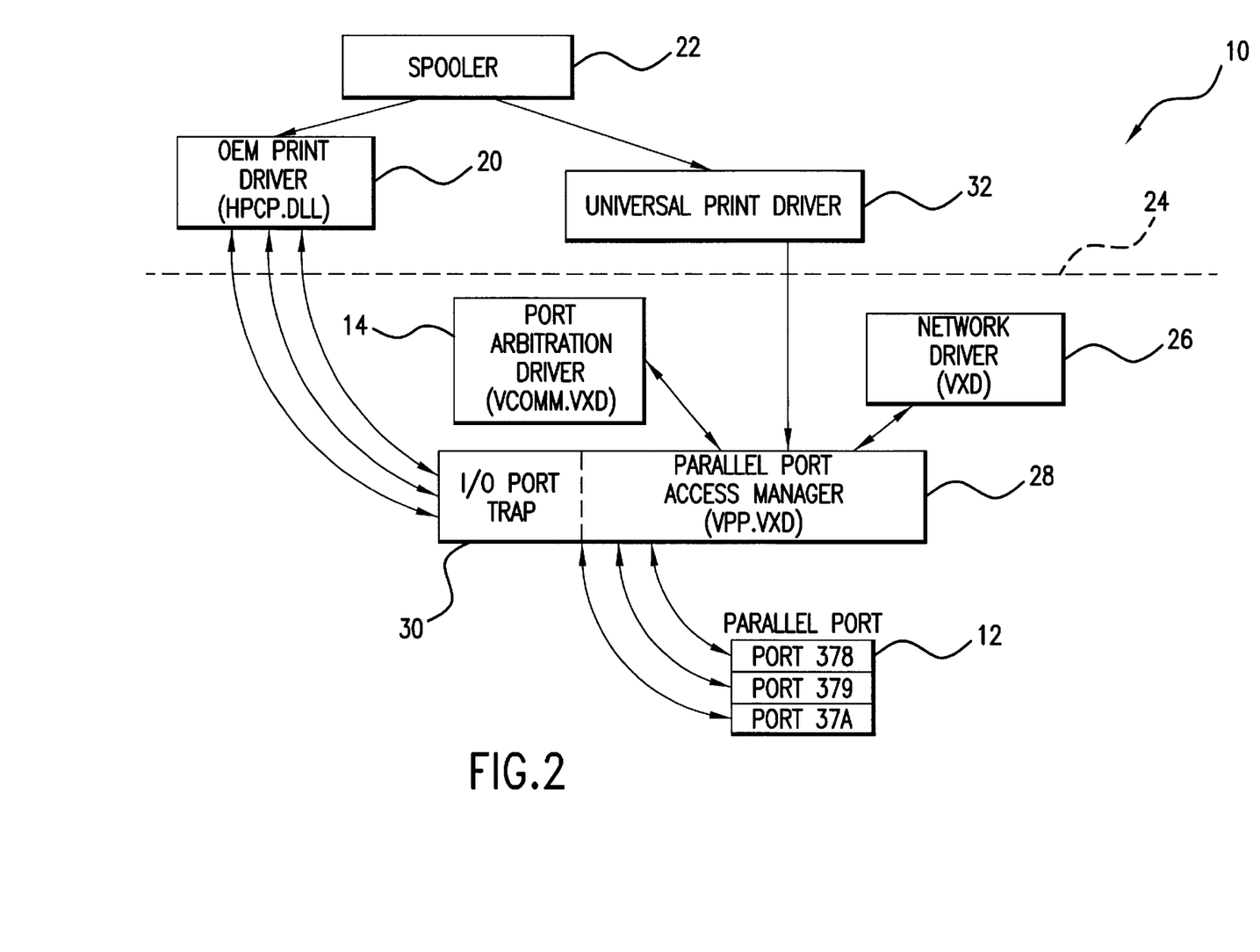
FIG. 2 is a block diagram illustrating an approach to parallel port sharing that may be applied in a Windows®95 environment according to a first embodiment of the present invention.

In accordance with a first embodiment of the present invention, illustrated in FIG. 2, host device 10 is configured to permit sharing of parallel port 12 in a manner that avoids the conflicts inherent in the prior art approach shown in FIG. 1. In this particular embodiment, as is explained further below, parallel port 12 may be used for both printer traffic and network traffic. Host device 10 comprises, for example, a personal computer, a laptop computer, a network computer, or any other data processing device that uses a parallel port to communicate with external devices.

In the embodiment of FIG. 2, access to parallel port 12 is governed by a parallel port access manager 28. In this particular embodiment, parallel port access manager 28 comprises a virtual device driver, designated VPP.VXD. Parallel port access manager 28 is configured to control the flow of printer traffic from or to an external printer (not shown). In this embodiment, printer traffic may be originated by port arbitration driver 14, universal print driver 32, or OEM print driver 20. In addition, parallel port access manager 28 is configured to control the flow of network traffic from or to a computer network (not shown). Such network traffic may be exchanged with applications running on host device 10 through a network driver 26.

The operation of port arbitration driver 14 in the present embodiment is substantially the same as that described above with reference to the prior art arrangement shown in FIG. 1. Here, however, rather than processing requests for control of parallel port 12 from multiple drivers respectively associated with separate peripheral devices, port arbitration driver 14 only interfaces with parallel port access manager 28.

Universal print driver 32 may be used by certain applications running on host device 10 to print data on an attached printer. Universal print driver 32 is supplied with Windows®95 and uses the port monitor interface API (Application Program Interface), as documented in the Microsoft Windows®95 Device Developer Kit Design Guide (January 1988). For example, universal print driver 32 may receive a request to print data buffered in spooler 22. Rather than passing that data directly to parallel port 12, however, universal print driver is instead configured to pass the data to parallel port access manager 28 via the port monitor interface.

With respect to OEM print driver 20, it was noted above that drivers of this type are configured to interface directly with parallel port 12. In the prior art arrangement shown in FIG. 1, for example, OEM print driver 20 wrote data directly to the I/O registers of parallel port 12. However, as discussed above, such direct access to parallel port 12 can cause conflict problems in a parallel port sharing arrangement. To address this problem, parallel port access manager 28 in the embodiment shown in FIG. 2 includes an I/O port trap 30 that effectively simulates a printer in software/firmware. Thus, when OEM print driver 20 writes data to the I/O registers (Ports 378, 379 and 37A), that data is captured in I/O port trap by using the I/O protection features in the processor. I/O traps are set for the addresses of the I/O registers, enabling parallel port access manager 28 to be called before the I/O actually occurs. In the case of VxD's, the I/O trap is implemented using the API call Install_IO_Handler, as documented in the Microsoft Windows® Device Driver Kit (1992). Thus, parallel port access manager 28 can then control when the data is actually passed to parallel port 12. As far as OEM print driver 20 is concerned, it is interfacing with parallel port 12. OEM print driver 20 may still direct printer traffic to, for example, LPT1, and parallel port access manager 28 ensures that the traffic is ultimately passed to parallel port 12.

It should be noted that the printer traffic managed by parallel port access manager 28 is typically bidirectional. That is, the attached printer will typically communicate information back to host device 10 during a print transaction, such as an acknowledgment that a data packet was successfully received.

In addition to governing the use of parallel port 12 for printer traffic from a number of possible sources, parallel port access manager 28 in the present embodiment is also configured to govern the use of parallel port 12 for transferring network traffic between host device 10 and a network (not shown). As illustrated in FIG. 2, parallel port access manager 28 interfaces with network driver 26 for this purpose. Network driver 26 may comprise, for example, a software module modeled on an NDIS (Network Driver Interface Specification) 3.0 or higher driver (see Microsoft Windows®95 Device Developer Kit Design Guide (January 1988)), and may include executable instructions for facilitating the repackaging and moving of network data between network protocol stacks (not shown) of host device 10 and a network interface (not shown).

Since parallel port access manager 28 in the embodiment of FIG. 2 is configured to handle both printer and network traffic, it may be desirable to provide a means for external devices coupled to parallel port 12, such as a network adapter (not shown), to distinguish between the different types of traffic transferred to parallel port 12. Accordingly, parallel port access manager 28 may be programmed to operate in accordance with a predetermined data transfer protocol, whereby parallel port access manager 28 would add header information to data packets (for example, at the beginning or end of the packet) before passing those data packets to parallel port 12. A downstream process, such as a packet router function in an attached network adapter, could then use the header information to determine, for example, whether to route the data packet received from parallel port 12 to a printer or onto a network.

Figure 3:
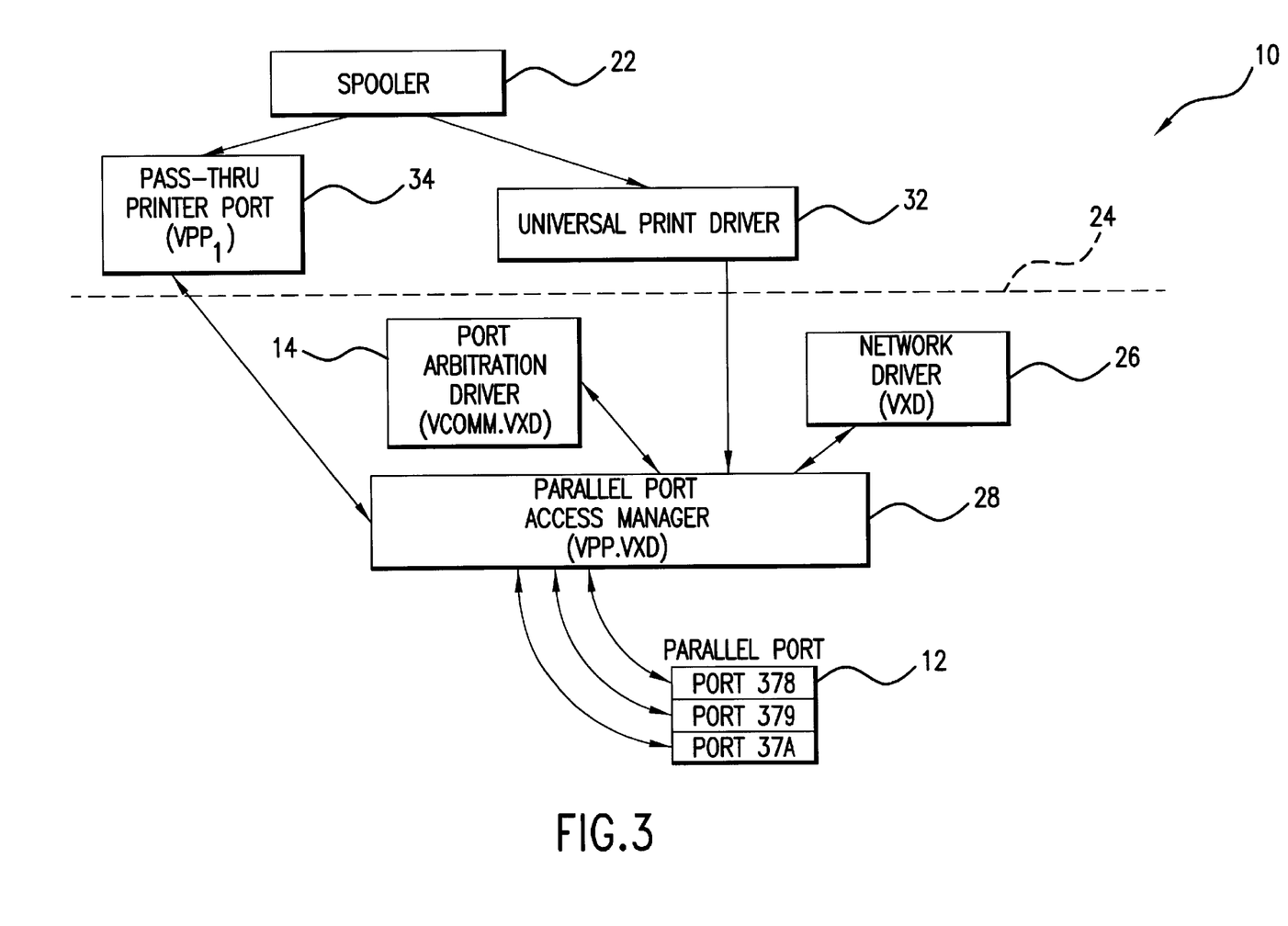
FIG. 3 is a block diagram illustrating an approach to parallel port sharing according to a second embodiment of the present invention, providing an alternative to the embodiment of FIG. 2.

FIG. 3 illustrates an embodiment of the present invention that provides an alternative to the use of an I/O port trap, such as in the embodiment of FIG. 2, for achieving parallel port sharing in a Windows®95 environment. In this particular embodiment, a pass-thru printer port 34, designated $VPP_1$, is provided. Pass-thru printer port 34 interfaces directly with parallel port access manager 28 in the manner described above. By configuring applications running on host device 10 to designate $VPP_1$ as the printer port (as opposed to, for example, LPT1), printer traffic will be directed to pass-thru printer port 34, and in turn routed to parallel port access manager 28. From this point, the received printer traffic would be processed in the same manner as described above with respect to the embodiment of FIG. 2. Use of this alternate embodiment may be advantageous in environments where implementation of the previously-described embodiment results in undesirably slow performance, or a loss of specialized functionality provided by certain printers.

Figure 4:
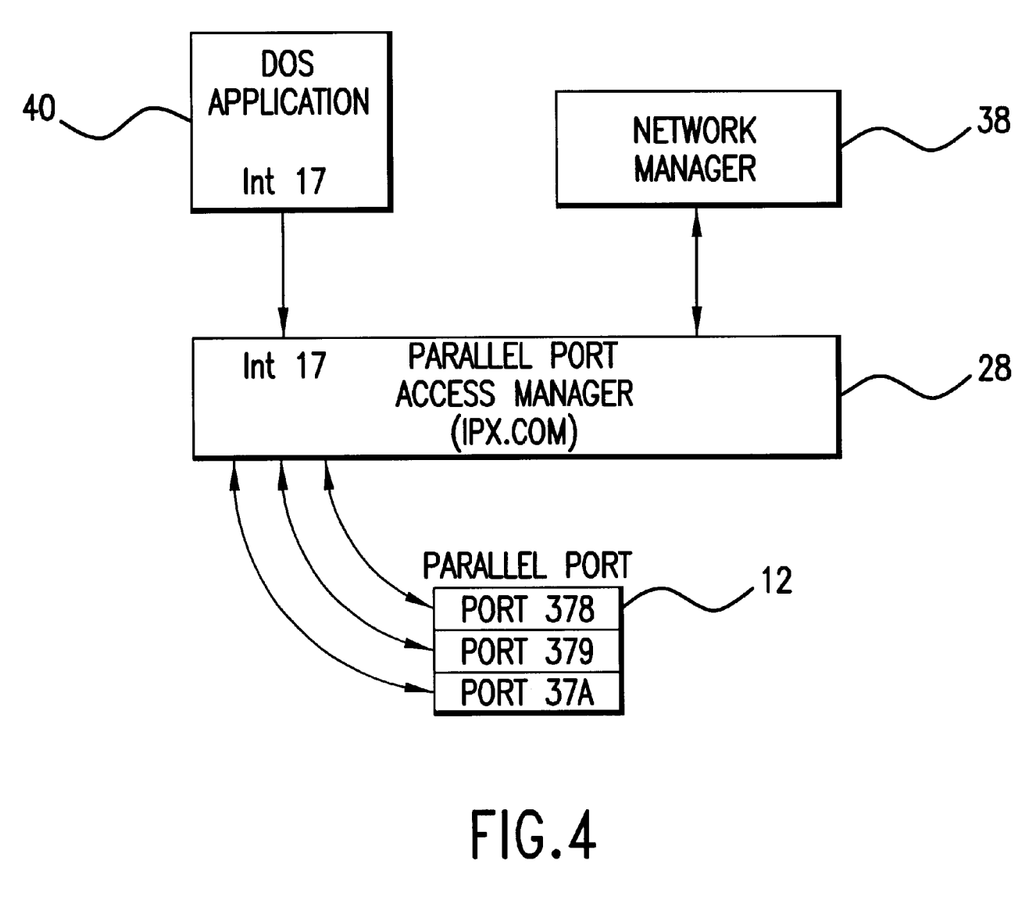
FIG. 4 is a block diagram illustrating an approach to parallel port sharing that may be applied in a DOS or Windows® 3.x environment according to a third embodiment of the present invention.

FIG. 4 illustrates another embodiment of the present invention directed to providing parallel port sharing functionality in a DOS or Windows®3.x environment. Parallel port sharing in such environments can be somewhat problematic due to limitations of the respective operating systems. For example, in a DOS environment it is difficult to reliably detect when an application prints. See Programmer's PC Source Book (1991). If an application is "well-behaved" (that is, writes to printer using installed BIOS services), it is possible to provide parallel port sharing for local printer traffic and network traffic; however, if an application is "ill-behaved" (that is, attempts to communicate directly with the printer instead of through the BIOS services), it may be necessary to temporarily disable network traffic during printing.

With reference now to FIG. 4, in this particular embodiment parallel port access manager 28 may be implemented, for example, as a driver modeled on the IPX.COM driver. IPX.COM is a well-known basic network driver that is a good model because it interfaces well with the minimal memory footprint that is required for games and DOS usage. See Novell LAN Driver Developers Guide (1991). In this embodiment, higher-level processing of network traffic may be handled by, for example, network manager 38. Network manager 38 may comprise, for example, a software package such as MSClient®3.0 from Microsoft. Network manager 38 interfaces directly with parallel port access manager 28, and governs the flow of network traffic in essentially the same manner as described above with respect to the embodiments illustrated in FIGS. 2–4. As for controlling the flow of printer traffic, the present embodiment implements another type of I/O trap arrangement using the well-known "Int 17" BIOS call. Here, parallel port access manager 28 is configured to receive printer traffic sent by DOS application 40. Once the printer traffic is received from DOS application 40, parallel port access manager 28 may then control when that data is provided to parallel port 12.

Figure 5:
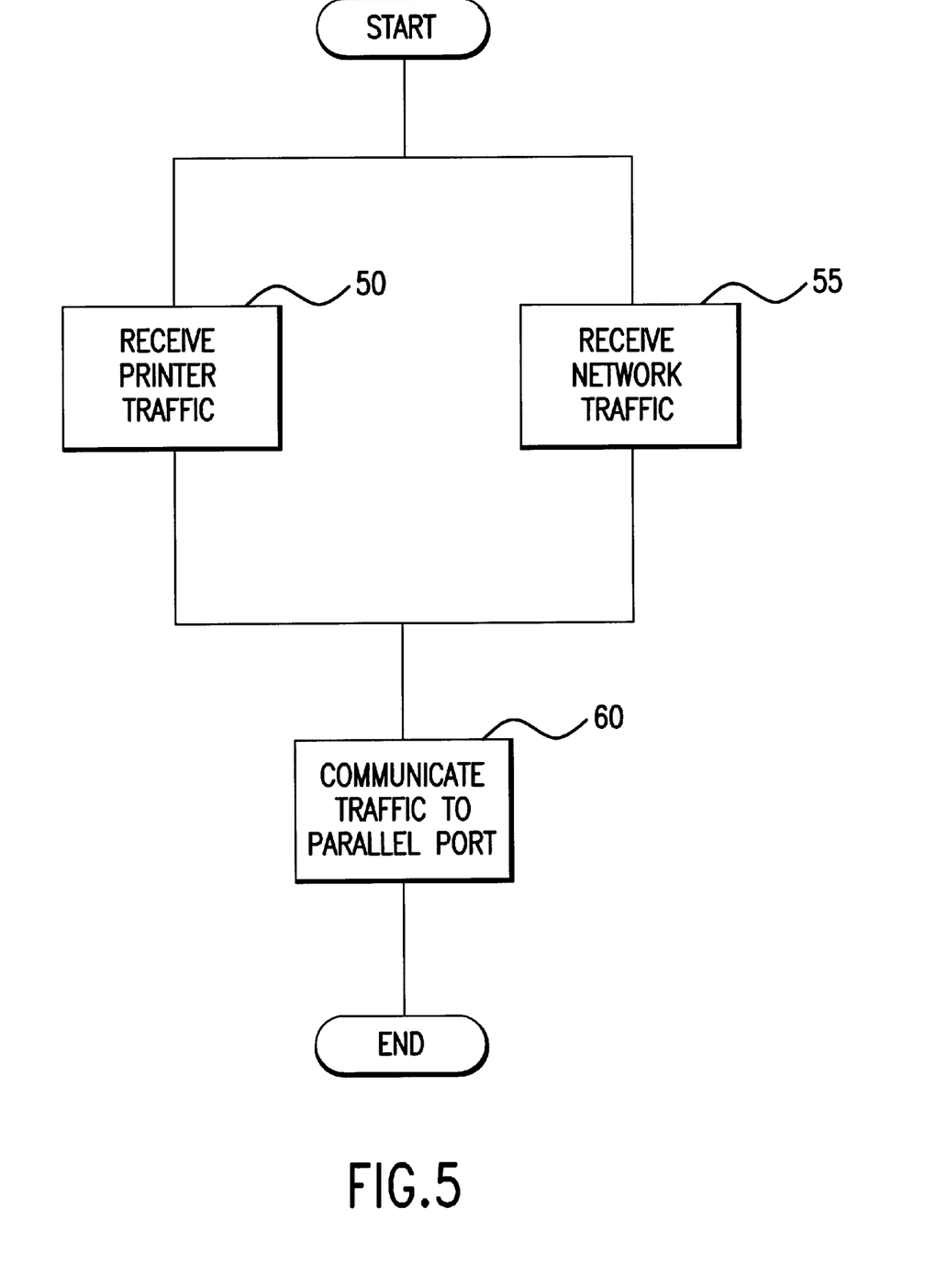
FIG. 5 is a flow diagram illustrating a method for parallel port sharing that may be implemented in accordance with the embodiments shown in FIGS. 2–4.

By way of further illustration, FIG. 5 illustrates a method for parallel port sharing that may be implemented using the structures described with reference to the embodiments of FIGS. 2–4. In accordance with this embodiment, all printer traffic directed to the parallel port is received by, for example, a parallel port access manager (Step 50). In addition, all network traffic directed to the parallel port is received (Step 55). The received printer traffic and network traffic are then directed to the parallel port in a controlled manner (Step 60), thereby enabling the parallel port to be shared without the risk of a resource conflict.

Figure 6:
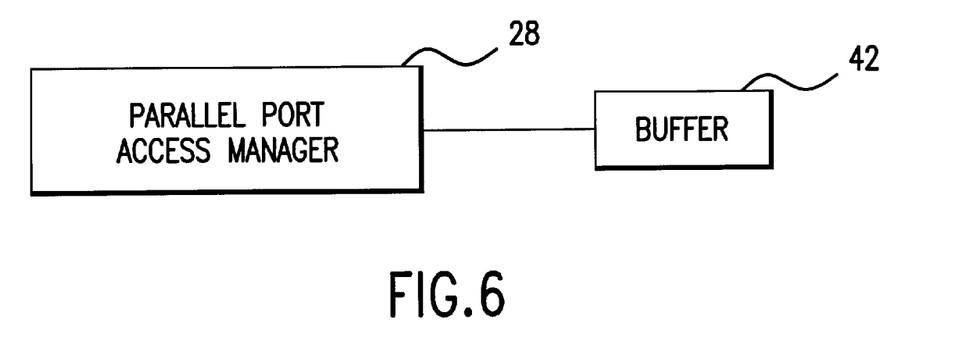
FIG. 6 is a block diagram illustrating a variation of the embodiments shown in FIGS. 2–4, in which a parallel port access manager is coupled to a buffer.

With reference to FIG. 6, in accordance with a possible variation of the embodiments illustrated in FIGS. 2–4, parallel port access manager 28 may have access to a buffer 42 for storage of traffic received from a print driver or a network driver pending transmission through parallel port 12. Buffer 42 may be implemented, for example, as a portion of a memory installed in host device 10 dedicated for use by parallel port access manager 28. The use of buffer 42 enables parallel port access manager 28 to refrain from sending traffic to parallel port 12 until some predetermined quantum of data is received. For example, in the case of printer traffic, parallel port access manager 28 might buffer traffic from a print driver until the entirety of a given print job is received. Parallel port access manager 28 could then transfer the buffered data to parallel port 12 in blocks, thus achieving improvements in transfer efficiency improvements.

It should be noted that embodiments of the present invention, including those described in detail above, may be distributed, for example, as a set of executable instructions residing on a storage medium. Such a storage medium can be a memory of a computer; a piece of firmware; a portable storage device, such as a diskette or other magnetic storage device, or a CD-ROM; or any other medium on which it is known to store executable instructions.

The foregoing is a detailed description of particular embodiments of the present invention. Persons skilled in the art will recognize, however, that many alternatives, modifications and/or variations of the disclosed embodiments are possible. For example, embodiments of the present invention may readily be applied to operating system environments in addition to those specifically mentioned above. In addition, a parallel port access manager may be implemented in forms other than the types of drivers explicitly described above. In addition, the present invention embraces all alternatives, modifications and variations that fall within the letter and spirit of the claims, as well as all equivalents of the claimed subject matter.

What is claimed:

1. A method for managing shared use of a parallel port installed in a host device for communicating with a plurality of peripheral devices, the host device including a first peripheral device driver configured to access the parallel port under control of a port arbitration driver and a second peripheral device driver configured to access the parallel port by directly addressing an I/O register associated with the parallel port, said method comprising:

configuring a parallel port access manager within the host device to receive all data traffic directed to peripheral devices through the parallel port, wherein the received data traffic includes both data traffic originating from the first peripheral device driver under control of the port arbitration driver and data traffic originating from the second peripheral device driver directly addressed to the I/O register associated with the parallel port;

receiving a first type of data traffic at the parallel port access manager from the first peripheral device driver, the first type of data traffic being directed to a first peripheral device in communication with the host device;

receiving a second type of data traffic at the parallel port access manager from the second peripheral device driver, the second type of data traffic being directed to a second peripheral device in communication with the host device; and selectively communicating said received first and second types of data traffic to the associated first and second peripheral devices through the parallel port.

2. The method of claim 1, further comprising receiving at the parallel port access manager at least one of the first and second types of data traffic from the parallel port.

3. The method of claim 1, further comprising buffering said received first and second types of data traffic before communicating said received first and second types of data traffic to the parallel port.

4. The method of claim 1, wherein the first type of data traffic is associated with a printer.

5. The method of claim 4, wherein the second type of data traffic is associated with a network interface.

6. The method of claim 1, wherein said selectively communicating comprises alternately forwarding the first and second types of data traffic to the parallel port.

7. A computer-implemented apparatus for managing shared use of a parallel port installed in a host device, the parallel port being using by the host device to communicate with each of a plurality of peripheral devices, and the host device including a first peripheral device driver configured to access the parallel port under control of a port arbitration driver and a second peripheral device driver configured to access the parallel port by directly addressing an I/O register associated with the parallel port, said apparatus comprising:

a first interface to a first peripheral device driver in the host device configured to communicate with a first peripheral device through the parallel port under control of the port arbitration driver;

a second interface to a second peripheral device driver in the host device configured to communicate with a second peripheral device by directly addressing an I/O register associated with the parallel port;

a third interface to the parallel port; and instructions for receiving at the first and second interfaces all data traffic directed to peripheral devices by the first and second peripheral device drivers, identifying first and second types of data traffic received from the first and second peripheral device drivers respectively, the first and second types of data traffic being respectively associated with the first and second peripheral devices, and selectively communicating the first and second types of data traffic to the associated peripheral devices through the parallel port using the third interface.

8. The apparatus of claim 7, wherein at least one of the first and second types of data traffic comprises printer traffic.

9. The apparatus of claim 7, wherein at least one of the first and second types of data traffic comprises network traffic.

10. The apparatus of claim 7, wherein the first type of data traffic comprises printer traffic and the second type of data traffic comprises network traffic.

11. The apparatus of claim 7, wherein said apparatus is implemented as a virtual device driver.

12. The apparatus of claim 7, father comprising a buffer for temporarily storing the received data traffic.

13. The apparatus of claim 7, wherein said interface to the first driver is associated with a logical identifier assigned to the parallel port during configuration of the host device.

14. The apparatus of claim 11, wherein said interface to the first driver comprises an I/O port trap.

15. A storage medium containing a set of instructions for execution by a computer having a parallel port for communicating with a plurality of peripheral devices, a first peripheral device driver configured to access the parallel port under control of a port arbitration driver, and a second peripheral device driver configured to access the parallel port by directly addressing an I/O register associated with the parallel port, the set of instructions enabling shared use of the parallel port for communicating with the plurality of peripheral devices, said set of instructions comprising instructions for:

receiving all data traffic directed to peripheral devices through the parallel port, including both data traffic originating from the first peripheral device driver under control of the port arbitration driver and data traffic originating from the second peripheral device driver directly addressed to the I/O register associated with the parallel port;

identifying a first type of received data traffic, the first type of received data traffic being directed to a first peripheral device in communication with the computer by the first peripheral device driver;

identifying a second type of received data traffic, the second type of received data traffic being directed to a second peripheral device in communication with the computer by the second peripheral device driver; and selectively communicating said received first and second types of data traffic to the associated first and second peripheral devices through the parallel port.

16. The storage medium of claim 15, further comprising instructions for receiving at the parallel port access manager at least one of the first and second types of data traffic from the parallel port.

17. The storage medium of claim 15, further comprising instructions for buffering said received first and second types of data traffic before communicating said received first and second types of data traffic to the parallel port.

18. The storage medium of claim 15, wherein said storage medium comprises a magnetic storage device.

19. The storage medium of claim 15, wherein said storage medium comprises a memory of the computer.

20. A computer system configured for selectively communicating with each of a plurality of peripheral devices through a single parallel port, said computer system comprising:

a parallel port providing communications connectivity between the computer system and a plurality of peripheral devices;

a port arbitration driver configured to manage access to the parallel port by a plurality of processes within the computer system;

a first device driver configured for communicating with a first peripheral device through the parallel port under control of the port arbitration driver;

a second device driver configured for communicating with a second peripheral device through the parallel port outside of control of the port arbitration driver; and a parallel port access manager arranged between the parallel port and the first and second device drivers, the parallel port access manager including executable instructions for receiving all data traffic directed to the parallel port by the first and second device drivers, and for selectively transferring data traffic received from the first and second drivers to the corresponding first and second peripheral devices through the parallel port in a controlled manner.

21. The computer system of claim 20, wherein the parallel port comprises an I/O register and the second device driver is configured to communicate with the second peripheral device by directly addressing the I/O register of the parallel port, and the parallel port access manager comprises an 1/O port trap.

22. The computer system of claim 20, wherein the parallel port access manager further includes executable instructions for determining which of the first or second peripheral devices received data traffic is directed to, and for reformatting the received data traffic in accordance with a communications protocol associated with that peripheral device before transferring the data traffic.

23. The computer system of claim 20, wherein the first driver comprises a universal print driver and the second driver comprises a network driver.

* * * * *